G., L. & G. J. A. FULLER.
METHOD OF CONSTRUCTING SECONDARY OR STORAGE BATTERIES.
APPLICATION FILED NOV. 15, 1912.

1,092,252.

Patented Apr. 7, 1914.

WITNESSES

INVENTORS.
George Fuller
Leonard Fuller
George John Andrew Fuller
by Day & Pick ATTORNEYS

UNITED STATES PATENT OFFICE.

GEORGE FULLER, LEONARD FULLER, AND GEORGE JOHN ANDREW FULLER, OF BOW, LONDON, ENGLAND.

METHOD OF CONSTRUCTING SECONDARY OR STORAGE BATTERIES.

1,092,252.   Specification of Letters Patent.   Patented Apr. 7, 1914.

Application filed November 15, 1912.  Serial No. 731,484.

*To all whom it may concern:*

Be it known that we, GEORGE FULLER, LEONARD FULLER, and GEORGE JOHN ANDREW FULLER, subjects of the King of Great Britain, residing at Bow, in the county of London, England, have invented a new and useful improved method of constructing secondary or storage batteries in which masses of active material are employed instead of the usual Planté or pasted plates, and of which the following is a specification.

This invention relates to improvements in the method of constructing secondary or storage batteries, so that instead of the usual plate electrode of the Planté or pasted type, the electrodes are in the form of blocks which will withstand hard wear and tear.

Heretofore the plate type of accumulator electrodes have failed because of the weakness in construction causing the active material to become dislodged after being subjected to wear and tear and to the distortion of the plates when subjected to the least overstrain, and, again, plate electrodes are particularly subject to the condition known as sulfating, especially when neglected while in the discharged condition.

It is the object of the present invention to prevent such defects by producing the electrodes in block form, so that each electrode constitutes a practically true section of either a rectangular or cylindrical cell, wherefore they can be fitted together to form a practically solid accumulator, the separate elements being held apart by suitable separators.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 1:
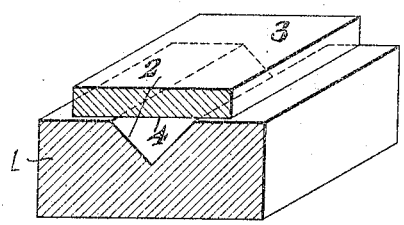
Figure 2:
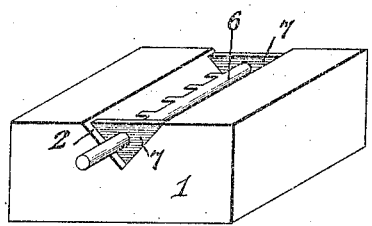
Figure 3:
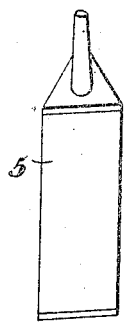
Figure 11:
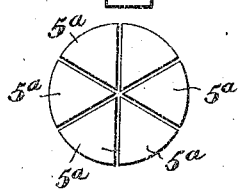
Figure 7:
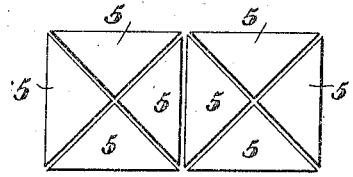
Figure 12:
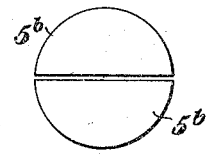
Figure 8:
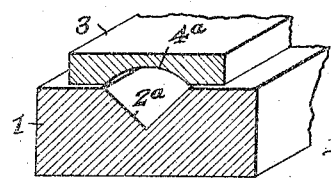
Figure 9:
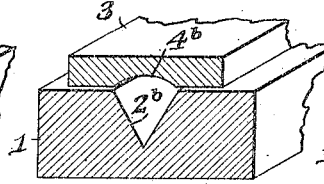
Figure 10:
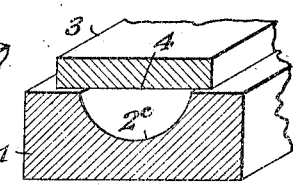

In the drawings:—Figure 1 is a section of a mold employed in the practice of the invention. Fig. 2 is a perspective view of the basic portion of the mold with the core in place. Fig. 3 is a perspective view of a complete electrode. Figs. 4, 5 and 6 and 7 are more or less diagrammatic plan views showing groups of triangular electrodes to form cells of varying sizes and types. Figs. 8, 9 and 10 are partially sectional views of other forms of molds. Figs. 11 and 12 are more or less diagrammatic plan views showing groupings of electrodes in which electrodes formed in the molds of Figs. 9 and 10 may be employed.

Referring to the drawings, the mold may be formed from a mass of metal or other such material in which a V-shaped slot is cut in the arrangement shown in Figs. 1, 2, 8 and 9. If the cell is to have a high internal resistance, the angle may reach ninety degrees. To make electrodes from such a mold, say, the one shown in Fig. 1, it is only necessary to place a lead core, as shown in Fig. 2, in the angle of the V-shaped groove or slot, the core having projections or angle pieces at each end so that it is in proper spaced relation to the angle of the V, and these projections or angle pieces form heads for the finished electrode. Active material, say, a mixture of lead oxid, is placed in the mold and pressed with a flat top or otherwise, so that the active material is tightly compressed about the core.

Figure 4:
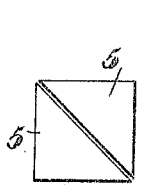
Figure 5:
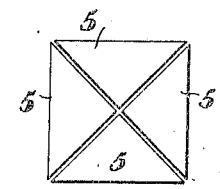
Figure 6:
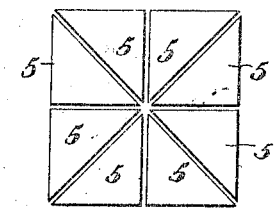

Electrodes or blocks in which the angle is ninety degres may be fitted together to form a square electrode. In Fig. 4 two such blocks, being triangular in cross section, are fitted together to form a single couple, while in Fig. 5 four such blocks are fitted together to form a cell of two couples, and in Fig. 6 four pairs or couples, such as shown in Fig. 4, are grouped together to form a square cell, while in Fig. 7 two groupings, such as shown in Fig. 5, are brought together.

The molds of Figs. 8 and 9 permit the forming of sectoral blocks which with Fig. 10 may be approximately semicylindrical. Fig. 11 shows a grouping of sectoral blocks such as may be constructed with the mold of Fig. 9, and Fig. 10 shows a grouping of two semi-cylindrical blocks such as would be formed in the mold of Fig. 10. The grouping of two electrodes into a couple forms a high resistance cell, while a low resistance cell is formed by a grouping of a greater number of couples, but in each instance the cell is particularly compact.

The electrode tapers in cross section from an intermediate point toward opposite edges, and while some of the forms are true triangles and others are in cross sections sectors of circles, all the forms are substantially trianguloids in cross section.

The terminal heads of the central metallic support, and especially the lower head, prevent any of the active material from dropping or becoming detached, while grouping of the parts into the compact form in which they may be held by suitable material of insulating nature prevents any parts of the active material from escaping. In all the forms each electrode is a geometric solid of such conformation that two or more may be assembled with suitable insulation between them into larger substantially geometric solids.

The electrodes, each comprising a section of a geometric solid representing the complete battery, are produced in an elongated mold in which the molding chamber is of substantially equal cross-sectional area throughout its length and the cross-section is either an actual or approximate triangle, so that it may be described as of trianguloid in cross-section. The mold as shown in Figs. 1, 2, 8, 9 and 10 has the side corresponding to the base of the trianguloid open, while the other sides of the mold approach toward an apex portion either as plane sides, as in Figs. 1, 2, 8 and 9, or as curved sides similar to the arrangement shown in Fig. 10, so that a plane longitudinal of the mold chamber and bisecting the apex of the trianguloid is also a perpendicular bisector of the basic portion of the trianguloid represented by the open side of the mold. A compression member in the form of a follower or other structure and either flat where presented toward the mold chamber as in Figs. 1 and 10, or having a rounded channel therein, as in Figs. 8 and 9, in which latter case the trianguloid electrode corresponds to Figs. 11 and 12, respectively, causes a compression of active material placed in the mold toward the approaching sides, so that by reaction the active material is directed toward the longitudinal central plane of the mold. If, now, a core such as shown in Fig. 2 be lodged in the mold, and this core be provided with end plates or heads forming the end walls of the mold chamber, the active material is compressed not only against the approaching side walls of the mold chamber, but is directed by these approaching side walls toward the longitudinal central plane of the mold chamber in a manner to become evenly compacted all about the core, although the pressure is applied only at the one open side of the mold chamber and in one direction.

In the drawing the mold is generally indicated at 1, and in Figs. 1 and 2 there is a mold chamber 2 of true triangular form, while a follower or compression member 3 has a plane face 4 presented toward the mold chamber, wherefore there are produced solids of true triangular cross section forming electrodes 5, one of which is shown separately in Fig. 3 and assemblages of these electrodes into geometric solids are shown in Figs. 4, 5, 6 and 7. In Figs. 2 and 3 there is shown a core 6 with end walls 7, which may be lodged in the mold chamber with the end walls 7 constituting the ends of the mold chamber preventing escape of the active material at these ends when subjected to pressure, the end walls 7 corresponding to the cross-sectional shape of the completed electrode.

In Fig. 11 the assembled battery is indicated as of cylindrical shape, while the electrodes each represent approximately a sector of the cylinder and are diagrammatically indicated at $5^a$. In Figs. 8 and 9 the mold 1 has mold chambers $2^a$ and $2^b$, respectively, each in the form of a groove of triangular shape but varying in angle from that shown in Figs. 1 and 2. The followers 3, however, have groove $4^a$ and $4^b$, curved on axes substantially coincident with the apexes of the triangular grooves $2^a$ and $2^b$, so that the resultant electrode will be a sector similar to $5^a$, but of greater or lesser circumferential extent in accordance with the groove $2^a$ or $2^b$ and the corresponding follower groove $4^a$ or $4^b$.

In Fig. 10 the mold 1 has a substantially semi-circular mold chamber $2^c$ while the follower 3 has a plane molding face 4, as in Fig. 1. An electrode formed in the mold of Fig. 10 will be nearly semi-cylindrical and such electrodes are illustrated in Figs. 12 at $5^b$ where two of them are assembled into a cylindrical battery.

In all of the different forms of electrodes they are in cross section either truly triangular or approach more or less of a triangular shape even in cases such as illustrated in Figs. 11 and 12, so that for the purpose of description all the electrodes may be defined as trianguloid in shape. Even in the mold of Fig. 10 the approaching walls tend to direct the material being compressed toward the central longitudinal bisecting plane of the mold chamber.

No claim is made herein to the article shown and described, since such article is fully shown, described and claimed in our application No. 788,129, filed September 4, 1913, for improvements in secondary or storage batteries.

What is claimed is:—

1. The method of forming secondary battery electrodes each representing a trianguloid section of a geometric solid, which consists in placing a core in a mold chamber corresponding in shape to the named section and open at the basic portion of the trianguloid, filling the mold with active material, and causing a compression of the material toward the longitudinal bisecting plane of the mold chamber by pressure applied to the active material at the open side of the mold chamber.

2. The method of forming secondary battery electrodes each representing a trianguloid section of a geometric solid, and each having a core embedded therein, which consists in placing a core in a mold chamber corresponding in shape to the named section with the body of the core in spaced relation to the walls of the mold chamber, said chamber being open at the basic portion of the trianguloid, filling the mold chamber with active material, and compressing the active material against the approaching walls of the mold chamber by pressure applied to the open side of the mold chamber to cause said active material to compress about that portion of the core remote from the open side of the mold chamber in intimate relation to said core and to the approaching walls of the mold chamber.

In witness whereof, we have signed our names to this specification, in the presence of two subscribing witnesses.

GEORGE FULLER.
LEONARD FULLER.
GEORGE JOHN ANDREW FULLER.

Witnesses:
O. J. WORTH,
H. D. JAMESON.